Patented May 29, 1945

2,377,031

UNITED STATES PATENT OFFICE 2,377,031

STABILIZATION OF FAT PRODUCTS

Frank A. Norris, Minneapolis, Minn., assignor to General Mills, Inc., a corporation of Delaware No Drawing. Application June 19, 1944, Serial No. 541,116. In Canada September 2, 1943

14 Claims. (Cl. 99—163)

The present invention relates to a process of stabilizing fatty products against the development of rancidity, and to the resultant product. The invention is directed particularly to fatty food products, such as oils, shortenings, salad dressings, spreads, and the like.

The present application is a continuation-in-part of my co-pending application Serial No. 511,373, filed November 22, 1943, which in turn is a continuation-in-part of my application Serial No. 488,277, filed May 24, 1943.

The present invention involves a synergistic antioxidant effect resulting from the combined use of a plurality of substances. It has been found that combinations of certain antioxidants produce a resultant stability far in excess of the sum of the stabilities obtained by the use of the compounds singly.

It is therefore a primary object of the present invention to provide a process of stabilizing fatty or oleaginous materials against oxidation and the development of rancidity.

It is another object of the invention to provide products containing fats or oils which are stabilized against oxidation and the development of rancidity.

A further object of the invention is to provide a process of stabilizing fatty or oleaginous products by means of antioxidants which exhibit synergistic effects.

These and other objects of the invention will be apparent from the following description of the invention with particular reference to specific examples which are to be understood as illustrative only and not as limiting the invention.

It has been found that a synergistic antioxidant effect is obtained by the conjoint use of p-amino-benzoic acid and compounds containing the ene-diol group

such as 1-ascorbic acid, vitamin C. While ascorbic acid, which is water-soluble, has been known to have antioxidant effect in aqueous media, it has not been particularly effective in the fats probably because of its extremely low solubility. Likewise, p-amino-benzoic acid by itself has not demonstrated any appreciable antioxidant effect in fats. When these two compounds are used together, however, they exhibit a pronounced synergistic effect which gives the product a stability far in excess of that of the untreated product. This is demonstrated by the following table showing the effect on rendered pork fat.

Table I

| Sample | "Swift" stability hours |
|---|---|
| 1. Rendered pork fat | 2½ |
| 2. (1)+0.1% p-amino-benzoic acid | 2¼ |
| 3. (1)+0.1% l-ascorbic acid | 11½ |
| 4. (2)+0.1% l-ascorbic acid | 60 |

In place of 1-ascorbic acid other compounds having the ene-diol grouping, such as reductone, dihydroxymaleic acid, analogues or isomers of ascorbic acid, such as iso-ascorbic acid, glucoascorbic, araboascorbic, etc., may be used.

It has also been found that a multiple synergistic effect is obtained in addition to the synergistic effect mentioned above when a heterocyclic oxygen compound of the type shown below is employed in addition to the p-amino-benzoic acid and a compound having the ene-diol group. The heterocyclic oxygen compounds which may be employed to produce this multiple synergy fall within the following classes: (1) The chromans, as for example, the hydroxychromans including the 6-hydroxychromans, the alpha, beta and gamma tocopherols, the alkyl tocols such as the 5,7-dimethyltocols; and the chroman-5,6-quinones. It is intended that the term "chromans" shall include the chroman-5,6-quinones, both herein and in the claims. (2) The chromenes, as for example, the hydroxychromenes such as the 6-hydroxychromenes and more particularly 6-hydroxy 2,2,4 trimethylchromene. (3) The coumarones, as for example, the hydroxycoumarones such as the 5-hydroxycoumarones and more particularly 5-hydroxy-2,4,6,7-tetramethylcoumarone. (4) The coumarans, as for example, the hydroxycoumarans, such as the 5-hydroxycoumarans and more particularly 5-hydroxy-2,4,6,7-tetramethylcoumaran, and the iso- and hydroxyisocoumaranones such as the 5- and 7-hydroxyisocoumaranones and more particularly 3-phenylisocoumaranone, 5-hydroxy-4,6,7-trimethylisocoumaranone, and 5-hydroxy-3-phenylisocoumaranone. The terms "coumarans" and "hydroxycoumarans" are intended to include the isocoumaranones and the hydroxyisocoumaranones herein and in the claims.

These compounds are all somewhat related to vitamin E and methods for their preparation can be found in the literature on the subject. Some of these compounds, particularly the tocopherols, occur naturally in vegetable oils and a sufficient quantity may be present naturally in which case no addition from an external source would be necessary.

The synergistic action of these compounds is demonstrated by the following table showing the effectiveness of tocopherol, 1-ascorbic acid and p-amino-benzoic acid on rendered pork fat.

*Table II*

| Sample | "Swift" stability hours |
|---|---|
| 1. Rendered pork fat | 2½ |
| 2. (1)+0.02% tocopherol | 13½ |
| 3. (1)+0.10% 1-ascorbic acid | 11½ |
| 4. (1)+0.10% p-amino-benzoic acid | 2½ |
| 5. (1)+0.02% tocopherol+0.10% 1-ascorbic acid | 400 |
| 6. (1)+0.02% tocopherol+0.10% p-amino-benzoic acid | 16½ |
| 7. (1)+0.10% p-amino-benzoic acid+0.10% 1-ascorbic acid | 107 |
| 8. (1)+0.10% p-amino-benzoic acid+0.10% 1-ascorbic acid+0.02% tocopherol | 640 |

The tocopherol employed was a mixture of alpha, beta and gamma tocopherols with the gammo tocopherol predominating. It was employed in the form of a concentrate and the amount of concentrate employed was sufficient to give 0.02 per cent tocopherol, by weight, in the stabilized rendered pork fat. The rendered pork fat employed was the article available on the market, and it was used in these tests without any additional purification. Hydrogenation of this impure material results in a decided increase in stability. The material employed for these tests, however, was not hydrogenated in view of the fact that even without this treatment the time required for some of the tests was prolonged for weeks because of the high stabilities. It will be apparent, however, that the process may be employed on other materials having originally higher stabilities, in which case it may be desirable to reduce the amount of antioxidant added.

Instead of the amounts of antioxidants shown above it is possible to employ decidedly lower concentration where such a high stability is not necessary. For example, it has been found that a rendered pork fat of about 6 hours initial stability was stabilized to a stability of about 43 hours by means of 0.0025 per cent tocopherol, 0.05 per cent p-amino-benzoic acid and 0.01 per cent 1-ascorbic acid. The lower limit of antioxidant appears to be dictated by the resultant stability desired. There does not appear to be any upper limit to the amount of antioxidant which may be employed. However, the cost of the antioxidant constituents usually dictates that they should not be employed in much greater than 0.1 per cent.

It is desired to point out that an apparent discrepancy exists between sample 4 in Table I and sample 7 in Table II, both of which samples are composed of rendered pork fat of the same original stability to which 0.1 per cent p-amino-benzoic acid and 0.1 per cent 1-ascorbic acid have been added. In the sample in Table I, the ingredients were merely weighed out and mixed together in an ordinary manner. In the sample in Table II the p-amino-benzoic acid and the 1-ascorbic acid were thoroughly ground together in a mortar and the resultant mixture was ground with a small portion of rendered pork fat to effect an intimate suspension. It is believed that this intimate distribution of the antioxidant constituents is responsible for the increased stability found.

In addition to its effect on the antioxidant properties of the product, p-amino-benzoic acid has been found to have a decided preservative action and represses microbiological growth. The common materials employed to inhibit oxidative rancidity in fats have no effect on microbiological growth. Consequently, yeast, molds, and the like, continue to grow and produce hydrolytic or other enzymic changes which result in rancidity. Thus, while the rancidity so produced is a distinct disadvantage in itself, the presence of large numbers of microorganisms is an even greater disadvantage in view of the possible ill effect on those who consume such a product.

It is apparent that these various objections to the prior art are overcome by the present invention in that it inhibits both oxidative rancidity and microbiological growth; obviously hydrolytic and enzymic rancidity normally accompanying microbiological growth is likewise inhibited. These results are produced by means of substances which are recognized vitamins and which, therefore, perform additional functions when consumed. Therefore, there should be no objection to the use of these substances from the standpoint of the food and drug authorities, as each of these substances is found widely distributed in ordinary food products.

While particular reference has been made to the use of 1-ascorbic acid as the compound having the ene-diol group in the multiple synergy, it is to be understood that other compounds having the ene-diol group, such as those specifically enumerated with respect to the single synergy, may also be used in the multiple synergy.

It is also to be understood that the invention is in no way limited to animal fats but may be employed on any product containing a substantial amount of fat or oil, whether of animal or vegetable origin and whether edible or not, all of which products are contemplated by the term "oleaginous material" as used in the appended claims.

I claim as my invention:

1. A composition of matter comprising an oleaginous material containing, and being stabilized against the development of rancidity by, a compound containing an ene-diol group, p-amino-benzoic acid, and a compound selected from the group consisting of the chroman-5,6-quinones, hydroxychromans, the hydroxychromenes, the hydroxycoumarans, hydroxycoumarones.

2. A composition of matter comprising an oleaginous material containing, and being stabilized against the development of rancidity by, an ascorbic acid, p-amino-benzoic acid, and a compound selected from the group consisting of the chroman-5,6-quinones, hydroxychromans, the hydroxychromenes, the hydroxycoumarans, and the hydroxycoumarones.

3. A composition of matter comprising an oleaginous material containing, and being stabilized against the development of rancidity by, a compound containing an ene-diol group, p-amino-benzoic acid and a tocopherol.

4. A composition of matter comprising an oleaginous material containing, and being stabilized against the development of rancidity by, an ascorbic acid, p-amino-benzoic acid and a tocopherol.

5. Process of stabilizing an oleaginous material which comprises incorporating therein a compound containing an ene-diol group, p-amino-benzoic acid, and a compound selected from the group consisting of the chroman-5,6-quinones, hydroxychromans, the hydroxychromenes, the hydroxycoumarans, the hydroxycoumarones.

6. Process of stabilizing an oleaginous material which comprises incorporating therein an ascorbic acid, p-amino-benzoic acid, and a compound selected from the group consisting of the chroman-5,6-quinones, hydroxychromans, the hydroxychromenes, the hydroxycoumarans, the hydroxycoumarones.

7. Process of stabilizing an oleaginous material which comprises incorporating therein a compound containing an ene-diol group, p-aminobenzoic acid and a tocopherol.

8. Process of stabilizing an oleaginous material which comprises incorporating therein an ascorbic acid, p-amino-benzoic acid and a tocopherol.

9. An edible shortening containing, and being stabilized against the development of rancidity by, a compound containing an ene-diol group, p-amino-benzoic acid, and a compound selected from the group consisting of the chroman-5,6-quinones, hydroxychromans, the hydroxychromenes, the hydroxycoumarans, the hydroxycoumarones.

10. An edible shortening containing, and being stabilized against the development of rancidity by, an ascorbic acid, p-amino-benzoic acid and a tocopherol.

11. A composition of matter comprising an oleaginous material containing, and being stabilized against the development of rancidity by, not substantially in excess of .1 per cent of each of a compound containing an ene-diol group, p-amino-benzoic acid, and a compound selected from the group consisting of the chroman-5,6-quinones, hydroxychromans, the hydroxychromenes, the hydroxycoumarans, the hydroxycoumarones.

12. A composition of matter comprising an oleaginous material containing, and being stabilized against the development of rancidity by, not substantially in excess of .1 per cent of each of an ascorbic acid, p-amino-benzoic acid and a tocopherol.

13. An edible shortening containing, and being stabilized against the development of rancidity by, not substantially in excess of .1 per cent of each of a compound containing an ene-diol group, p-amino-benzoic acid, and a compound selected from the group consisting of the chroman-5,6-quinones, hydroxychromans, the hydroxychromenes, the hydroxycoumarans, the hydroxycoumarones.

14. An edible shortening containing, and being stabilized against the development of rancidity by, not substantially in excess of .1 per cent of each of an ascorbic acid, p-amino-benzoic acid and a tocopherol.

FRANK A. NORRIS.